(12) United States Patent
Yamada

(10) Patent No.: US 9,307,154 B2
(45) Date of Patent: Apr. 5, 2016

(54) IMAGE PROCESSING DEVICE AND IMAGE PROCESSING METHOD FOR DISPLAYING AN IMAGE REGION OF A DISPLAY IMAGE WHICH INCLUDES A DESIGNATED CERTAIN POSITION

(71) Applicant: Panasonic Corporation, Osaka (JP)

(72) Inventor: Hitoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/375,156

(22) PCT Filed: Oct. 1, 2013

(86) PCT No.: PCT/JP2013/005856
§ 371 (c)(1),
(2) Date: Jul. 29, 2014

(87) PCT Pub. No.: WO2014/083737
PCT Pub. Date: Jun. 5, 2014

(65) Prior Publication Data
US 2015/0009366 A1    Jan. 8, 2015

(30) Foreign Application Priority Data
Nov. 30, 2012 (JP) ................. 2012-263639

(51) Int. Cl.
*H04N 5/232* (2006.01)
*G06T 3/40* (2006.01)

(52) U.S. Cl.
CPC .............. *H04N 5/23296* (2013.01); *G06T 3/40* (2013.01); *H04N 5/23212* (2013.01); *H04N 5/23232* (2013.01); *H04N 5/23293* (2013.01)

(58) Field of Classification Search
CPC .................................... H04N 5/23212
USPC .......................... 348/240.2, 222.1
See application file for complete search history.

(56) References Cited

U.S. PATENT DOCUMENTS

2008/0259176 A1 * 10/2008 Tamaru ............... 348/222.1
2010/0157127 A1    6/2010 Takayanagi et al.

FOREIGN PATENT DOCUMENTS

JP      9-102945      4/1997
JP      2004-135029   4/2004
(Continued)

OTHER PUBLICATIONS

International Search Report issued Dec. 10, 2013 in International (PCT) Application No. PCT/JP2013/005856.
(Continued)

*Primary Examiner* — Joel Fosselman
(74) *Attorney, Agent, or Firm* — Wenderoth, Lind & Ponack, L.L.P.

(57) ABSTRACT

An image processing device according to the present disclosure includes: a locating unit which locates a first in-focus region of each of plural images which are obtained by capturing a same subject and have different in-focus positions; and a display unit which displays a first image among the plural images, wherein when a certain position is designated on the first image displayed by the display unit, at least a second image having the first in-focus region which includes the certain position is selected from among the plural images, and the selected second image is displayed on the display unit.

13 Claims, 18 Drawing Sheets

(56) References Cited

FOREIGN PATENT DOCUMENTS

| JP | 2007-312097 | 11/2007 |
| JP | 2008-263486 | 10/2008 |
| JP | 2009-111635 | 5/2009 |
| JP | 2010-145693 | 7/2010 |
| JP | 2012-156747 | 8/2012 |

OTHER PUBLICATIONS

International Search Report issued Dec. 17, 2013 in International (PCT) Application No. PCT/JP2013/005856.

\* cited by examiner

IMAGE PROCESSING DEVICE AND IMAGE PROCESSING METHOD FOR DISPLAYING AN IMAGE REGION OF A DISPLAY IMAGE WHICH INCLUDES A DESIGNATED CERTAIN POSITION

TECHNICAL FIELD

The present invention relates to image processing devices and image processing methods.

BACKGROUND ART

A function (zoom function) is known which allows zooming in on an image captured by an imaging device and displaying the enlarged image. The zoom function is preinstalled, for example, in imaging devices such as digital cameras, and is used to enlarge a specific region of an image to be displayed in more detail.

For example, Patent Literature 1 discloses a technique of optionally selecting a zoom point when a user uses a camera to zoom in.

CITATION LIST

Patent Literature

[PTL 1] Japanese Unexamined Patent Application Publication No. H09-102945

SUMMARY OF INVENTION

Technical Problem

However, there is a problem that if a specific region of an image which includes a certain position (zoom point) is out of focus, an image (zoomed image) after zooming in appears unclear.

The present invention has been conceived in view of such circumstances, and an object thereof is to provide an image processing device and an image processing method which can clearly display an image region of a display image which includes a designated certain position.

Solution to Problem

In order to achieve the above object, an image processing device according to an aspect of the present invention includes: a locating unit configured to locate a first in-focus region of each of plural images which are obtained by capturing a same subject and have different in-focus positions; and a display unit configured to display a first image among the plural images, wherein when a certain position is designated on the first image displayed by the display unit, at least a second image having the first in-focus region which includes the certain position is selected from among the plural images, and the selected second image is displayed on the display unit.

It should be noted that these general and specific aspects may be implemented using a system, a method, an integrated circuit, a computer program, a computer-readable recording medium such as a CD-ROM, or any combination of systems, methods, integrated circuits, computer programs, and recording media.

Advantageous Effects of Invention

An image processing device and an image processing method according to the present invention allow clearly displaying an image region of a display image which includes a designated certain position.

BRIEF DESCRIPTION OF DRAWINGS

FIG. 1A illustrates an example of an image used for zooming in.

FIG. 7 is a diagram for describing examples of images displayed on a display unit before and after zooming in.

FIG. 8 is a diagram for describing examples of images displayed on the display unit before and after zooming in.

DESCRIPTION OF EMBODIMENTS (Underlying Knowledge Forming Basis of the Present Invention)

The inventors of the present application have found that a conventional image processing device described in the "Background art" section has the following problems.

A function (zoom function) is known which allows zooming in on an image captured by an imaging device and displaying the enlarged image. The zoom function is preinstalled, for example, in imaging devices such as digital cameras, and is used to enlarge a specific region of an image to be displayed in more detail.

Figure 1A:
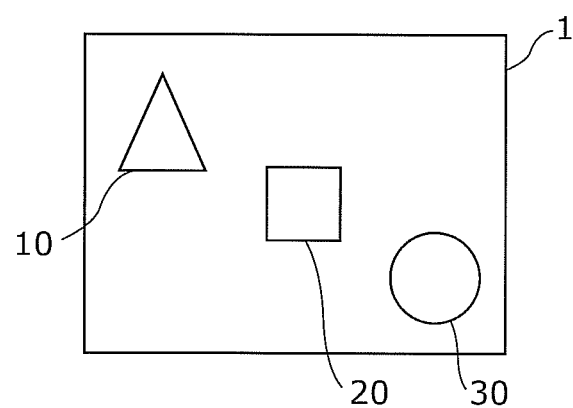
Figure 1B:
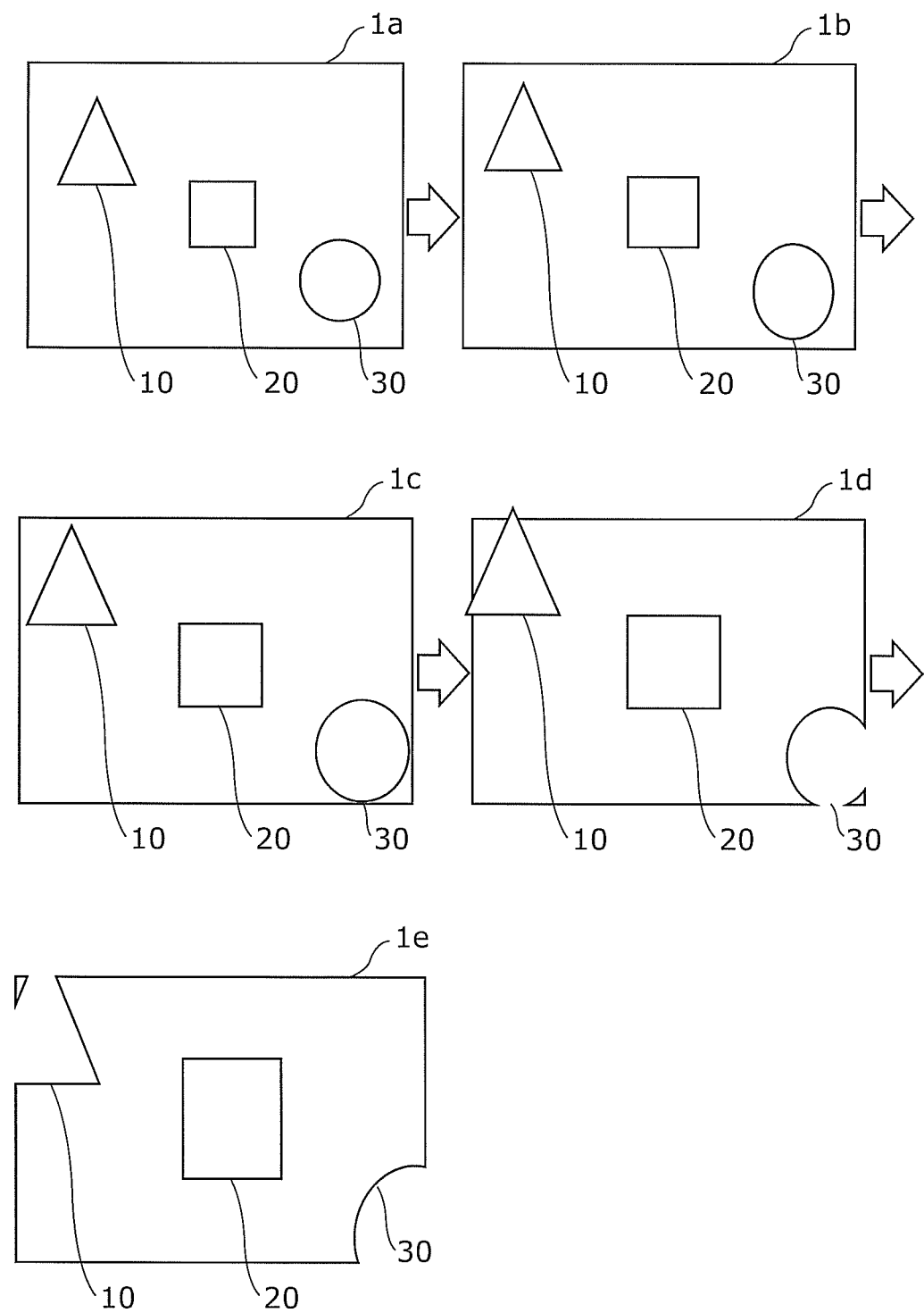
FIG. 1B illustrates examples of an image zoomed at center coordinates of the image illustrated in FIG. 1A which indicate a zoom point.

FIG. 1A illustrates an example of an image used for zooming in, and FIG. 1B illustrates an example of an image zoomed at center coordinates of FIG. 1A which indicate a zoom point.

An image 1 illustrated in FIG. 1A includes captured subjects 10, 20, and 30. Images 1a, 1b, 1c, 1d, and 1e illustrated in FIG. 1B show zoomed images that are obtained where the subject 20 of the image 1 serves as a zoom target or a zoom point (center coordinates). The images 1a, 1b, 1c, 1d, and 1e illustrated in FIG. 1B show images zoomed at different zoom magnifications, and show zoomed images obtained by enlarging the image 1 such that the selected zoom point or zoom target is the same. It should be noted that the reason why the size of the images 1a to 1e is the same is because after enlarging the image 1 (zoomed image), the resultant images are trimmed as necessary. Trimming allows the size of the images 1a, 1b, 1c, 1d, and 1e which have been zoomed to be the same as the size of the image 1 which has not been zoomed.

It should be noted that the selection of a zoom point or a zoom target is made before (prior to) zooming in on the image 1. For a general imaging device such as a camera, the center position of the image is often set to be a zoom point, as an initial value (initial setting).

In contrast, for example, PTL 1 discloses a technique of optionally selecting a zoom point used when a user makes a zoom using a camera. PTL 1 discloses a technique of setting a zoom point by making operation on a touch panel provided on a camera. Specifically, PTL 1 discloses a technique of controlling panning, tilting, zooming, and focusing of a camera by designating an icon on the camera with a hand or a mouse. Such a technique allows, via a touch panel, designation of setting a given zoom point for zooming in.

On the other hand, normally, the image zoom function is used to view in more detail a specific region of an image (zoom target). Thus, preferably, an image of a zoom target is captured in focus.

However, depending on imaging devices such as cameras, the image zoom function may be practically limited due to setting, and an image with near depth of field may be captured contrary to user intention.

Thus, conventionally, there is a case where an image is captured in an out-of-focus state, independently of the user intention. Then, there is a problem that if a zoom target which is out of focus, or in other words, a blurry zoom target is zoomed, the image which has been zoomed (enlarged and displayed) will appear still more unclear.

In particular, if a captured image is electronically zoomed (enlarged and displayed), the zoomed image appears yet more unclear. Furthermore, it is often difficult to even recognize a zoom target if an image is enlarged to a magnification exceeding the resolution of the image. Accordingly, an image of a zoom target before zooming in is preferably captured in focus, in order that the image after zooming in (zoomed image) appears sufficiently clear and a person can recognize the zoom target from the zoomed image.

In view of this, an aspect of the present invention is conceived in view of such circumstances, and an object thereof is to provide an image processing device and an image processing method for allowing clearly displaying an image region of a display image which includes a designated certain position.

In order to achieve such an object, an image processing device according to an aspect of the present invention includes: a locating unit configured to locate a first in-focus region of each of plural images which are obtained by capturing a same subject and have different in-focus positions; and a display unit configured to display a first image among the plural images, wherein when a certain position is designated on the first image displayed by the display unit, at least a second image having the first in-focus region which includes the certain position is selected from among the plural images, and the selected second image is displayed on the display unit.

This allows an image region of a display image which includes a designated certain position to be clearly displayed.

Further, for example, the image processing device further includes a blending unit configured to blend the first in-focus regions of the plural images located by the locating unit into a union of the first in-focus regions, to generate a second in-focus region, wherein the display unit is configured to display the first image and the second in-focus region superimposed on the first image.

For example, the image processing device may further include an image capture unit configured to capture the plural images by capturing sequentially in time plural images having different image capture parameters each including at least information on an in-focus position.

For example, the locating unit may be configured to locate, for each of the plural images, the first in-focus region using depth information of the image.

For example, the image processing device may further include: a setting unit configured to, when the certain position is designated on the first image displayed by the display unit, select at least the second image from among the plural images, and set a switching method which is to be used until the second image is displayed on the display unit; and an image generation unit configured to generate a zoomed image obtained by enlarging a region which includes at least the first in-focus region of the second image, in accordance with the switching method set by the setting unit, wherein the display unit may be configured to display, as the second image, at least the zoomed image of the second image generated by the image generation unit.

For example, the setting unit may be further configured to obtain, for each of the plural images, depth information of the image, and set the switching method based on the obtained depth information.

For example, the setting unit may be configured to select, based on the obtained depth information, a third image having the first in-focus region which has a depth value between a depth value of the first in-focus region of the second image and a depth value of the first in-focus region of the first image, and as the switching method, make a setting for displaying the third image on the display unit until the second image is displayed on the display unit, the image generation unit may be configured to generate at least a first zoomed image and a second zoomed image in accordance with the switching method, the first zoomed image being obtained by enlarging a region which includes the first in-focus region of the third image and a region of the third image corresponding to the first in-focus region of the second image, the second zoomed image being obtained by enlarging a region which includes the first in-focus region of the second image, and the display unit may be configured to display, in order, the first zoomed image and the second zoomed image generated by the image generation unit.

For example, as the switching method, the setting unit may be configured to make a setting for displaying a third image on the display unit until the second image is displayed on the display unit, the third image being obtained by blending the second image and the first image in a predetermined ratio, the image generation unit may be configured to generate at least a first zoomed image and a second zoomed image in accordance with the switching method, the first zoomed image being obtained by enlarging a region which includes the first in-focus region of the third image and a region of the third image corresponding to the first in-focus region of the second image, the second zoomed image being obtained by enlarging a region which includes the first in-focus region of the second image, and the display unit may be configured to display, in order, the first zoomed image and the second zoomed image generated by the image generation unit.

For example, the image processing device may further include a determination unit configured to automatically determine and designate the certain position.

For example, the determination unit may be configured to determine the certain position in the second in-focus region generated by the blending unit.

For example, the image processing device may further include a receiving unit configured to receive input from a user to designate the certain position.

For example, the image processing device may further include: a detection unit configured to detect an amount of positional difference of the same subject between the plural images; and a correction unit configured to correct the amount of positional difference of the same subject between the plural images, based on the amount of positional difference detected by the detection unit.

To achieve the above object, an image processing method according to an aspect of the present invention includes: (a) locating a first in-focus region of each of plural images which are obtained by capturing a same subject and have different in-focus positions; and (b) displaying a first image among the plural images on a display unit, wherein when a certain position is designated on the first image displayed in step (b), at least a second image having the first in-focus region which includes the certain position is selected from among the plural images, and the selected second image is displayed on the display unit.

It should be noted that these general and specific aspects may be implemented using a system, a method, an integrated circuit, a computer program, a computer-readable recording medium such as a CD-ROM, or any combination of systems, methods, integrated circuits, computer programs, or recording media.

The following specifically describes an image processing device and an image processing method according to an aspect of the present invention, with reference to the drawings.

Each of the exemplary embodiments described below shows a general or specific example. The constituent elements, the arrangement and connection of the constituent elements, steps, the processing order of the steps, and the like described in the following embodiments are mere examples, and thus do not intend to limit the scope of the appended Claims. Therefore, among the constituent elements in the following exemplary embodiments, constituent elements not recited in any of the independent claims defining the most generic part of the inventive concept are described as arbitrary constituent elements.

Embodiment 1

Figure 2:
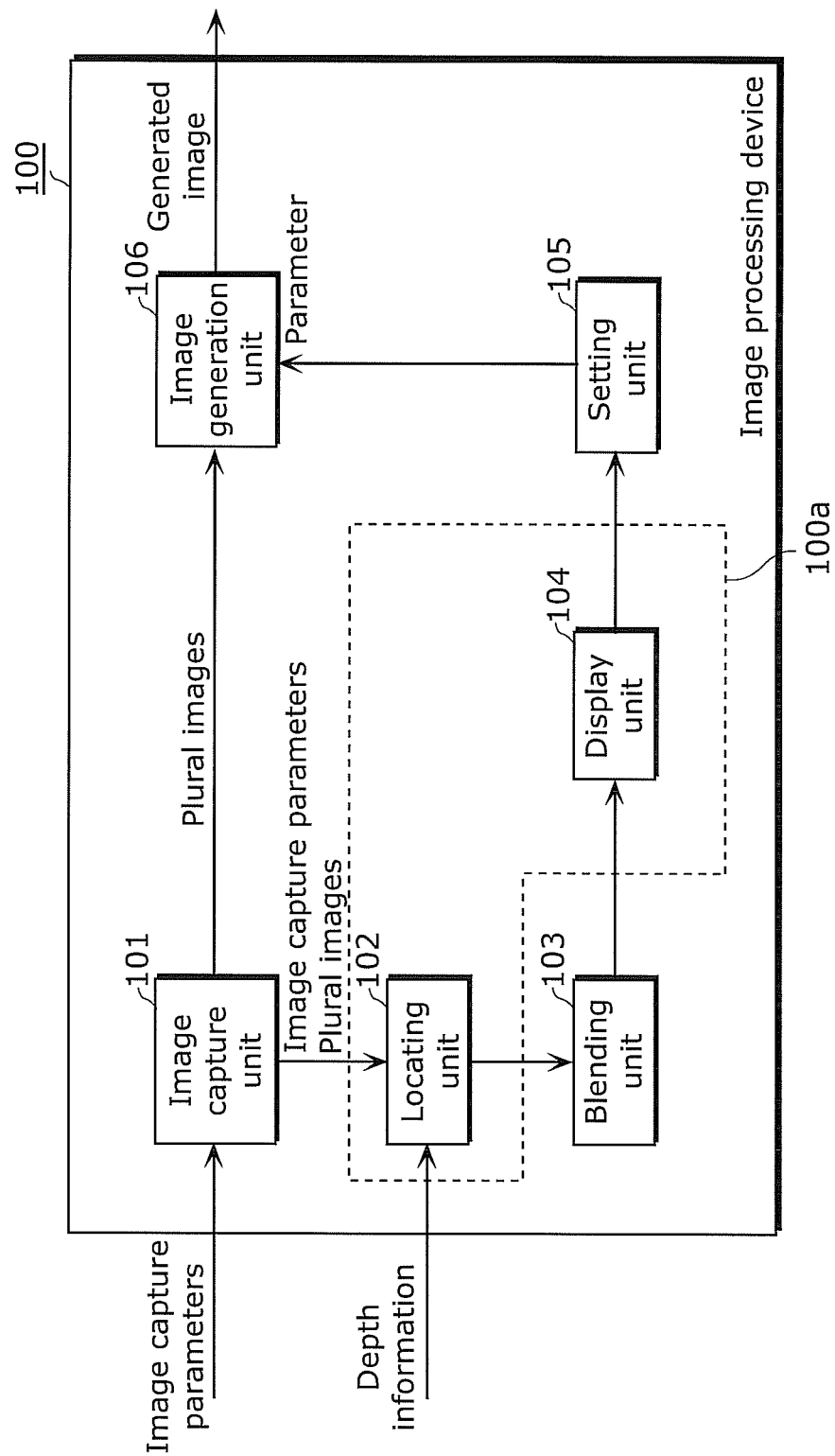
FIG. 2 is a block diagram illustrating a schematic structure of an image processing device according to Embodiment 1.

FIG. 2 is a block diagram illustrating a schematic configuration of an image processing device according to Embodiment 1.

An image processing device 100 illustrated in FIG. 2 includes an image capture unit 101, a locating unit 102, a blending unit 103, a display unit 104, a setting unit 105, and an image generation unit 106.

The image capture unit 101 captures sequentially in time plural images of the same subject which have different image capture parameters each including at least information on an in-focus position, thus obtaining the plural images having different in-focus positions.

Specifically, the image capture unit 101 obtains image capture parameters for plural images, and captures at least two images using different image capture parameters. Here, an image capture parameter includes at least an in-focus position of an image, and examples of the image capture parameter include parameters indicating an in-focus distance, an aperture, and the like. In the following, it is assumed that, to facilitate a description, plural images are captured at different in-focus distances, but the present invention is not limited to this.

As described above, the image capture unit 101 obtains plural images having different in-focus regions by capturing (shooting) plural images having different in-focus distances. It should be noted that plural images may be obtained by being sequentially captured by focal bracket photographing, or images captured as intermediate images that are obtained during certain processing may be used as plural images. Examples of the latter include depth from defocus (DFD) according to which depth information is estimated using plural images having different image capture parameters, auto focus (AF) according to which an in-focus position is determined from plural images, and others.

Figure 3A:
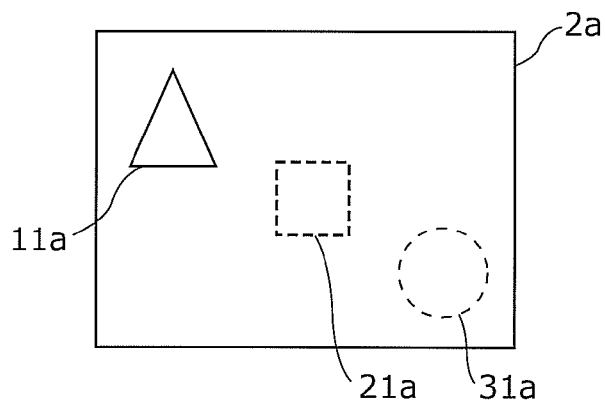
FIG. 3A illustrates an example of an image having different in-focus distances and captured by an image capture unit.
Figure 3B:
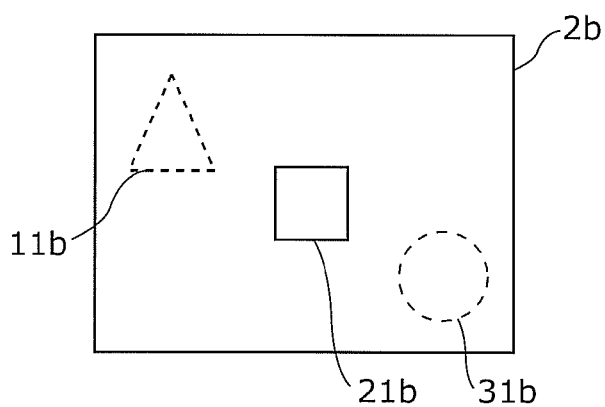
FIG. 3B illustrates an example of an image having different in-focus distances and captured by an image capture unit.
Figure 3C:
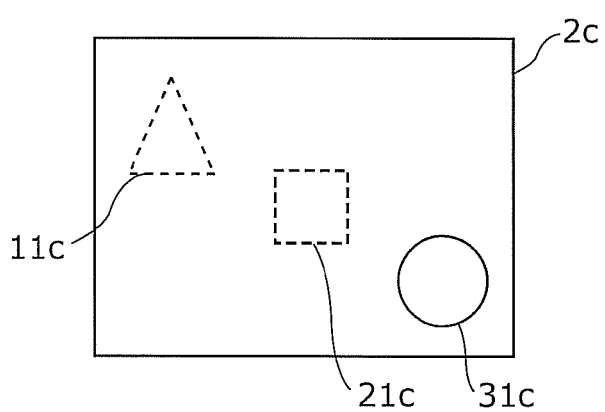
FIG. 3C illustrates an example of an image having different in-focus distances and captured by an image capture unit.
Figure 4:
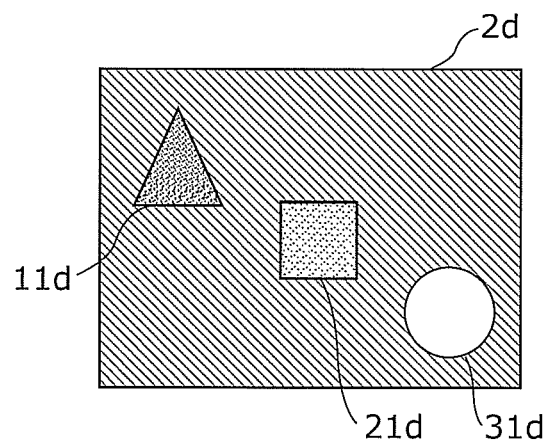
FIG. 4 illustrates a depth map of subjects in the image illustrated in FIGS. 3A to 3C.

FIGS. 3A to 3C illustrate examples of images having different in-focus distances and captured by the image capture unit. FIG. 4 illustrates a depth map of subjects in the images illustrated in FIGS. 3A to 3C. It should be noted that the depth map illustrated in FIG. 4 shows that the lighter the color is, the closer a subject is to a camera, and the darker the color is, the farther away a subject is from a camera. In addition, FIGS. 3A to 3C illustrate examples of three images of the subjects at the distances expressed by the depth map in FIG. 4, the three images having different in-focus distances.

It should be noted that subjects 11a, 21a, and 31a, subjects 11b, 21b, and 31b, subjects 11c, 21c, and 31c, and subjects 11*d*, 21*d*, and 31*d* illustrated in FIGS. 3A to 4 show the same subjects, respectively. In addition, an image 2*a* illustrated in FIG. 3A is captured with the in-focus distance being set to a far distance, and thus among the subjects 11*a*, 21*a*, and 31*a*, the subject 11*a* shown by a solid line is in focus. An image 2*b* illustrated in FIG. 3B is captured with the in-focus distance being set to a middle distance, and thus among the subjects 11*b*, 21*b*, and 31*b*, the subject 21*b* shown by a solid line is in focus. An image illustrated in FIG. 3C is captured with the in-focus distance being set to a close distance, and thus among the subjects 11*c*, 21*c*, and 31*c*, the subject 31*c* shown by a solid line is in focus.

The locating unit 102 locates a first in-focus region of each of plural images which are obtained by capturing the same subject and have different in-focus positions. For example, the locating unit 102 locates, for each of plural images, the first in-focus region of the image, using depth information of the image.

In the present embodiment, the locating unit 102 obtains (receives) plural images having different in-focus distances and captured by the image capture unit 101, and the in-focus distances and depth information obtained when the plural images are captured, and locates the in-focus region (the first in-focus region) of each image. Specifically, the locating unit 102 compares the depth information and in-focus distances obtained when the images are captured, and locates the in-focus region (the first in-focus region) in each image as shown in FIGS. 5A to 5C, for example.

Figure 5A:
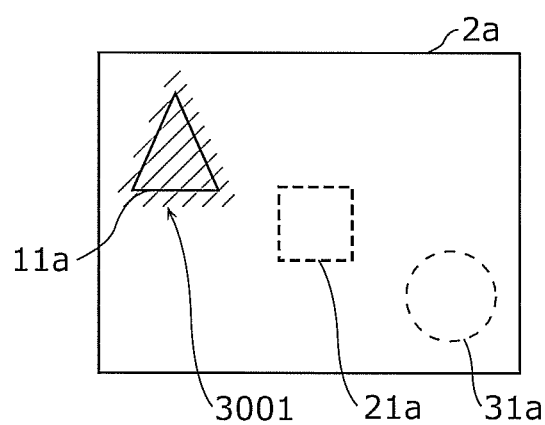
FIG. 5A illustrates an example of an in-focus region of the image having different in-focus distances and captured by the image capture unit.
Figure 5B:
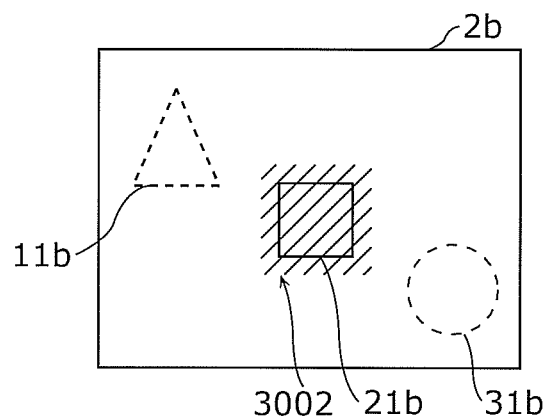
FIG. 5B illustrates an example of an in-focus region of the image having different in-focus distances and captured by the image capture unit.
Figure 5C:
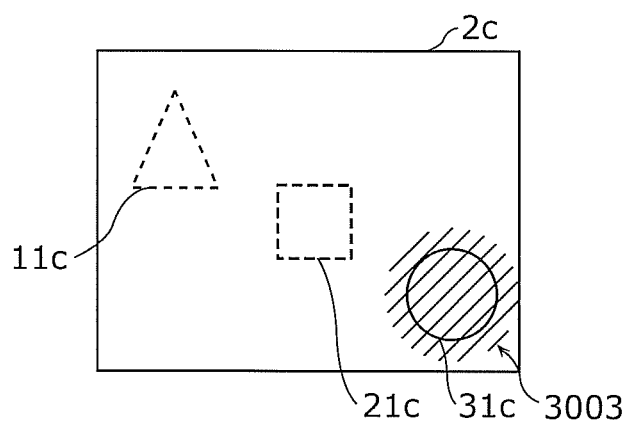
FIG. 5C illustrates an example of an in-focus region of the image having different in-focus distances and captured by the image capture unit.

Here, FIGS. 5A to 5C illustrate examples of in-focus regions of images having different in-focus distances, which are captured by the image capture unit. An in-focus region 3001 in FIG. 5A is a region (which includes the subject 11*a*) corresponding to the subject 11*a* in FIG. 3A. Similarly, an in-focus region 3002 in FIG. 5B is a region corresponding to the subject 21*b* in FIG. 3B, and an in-focus region 3003 in FIG. 5C is a region corresponding to the subject 31*c* in FIG. 3C. It should be noted that the in-focus regions 3001 to 3003 are examples of the first in-focus region, and correspond to the subjects at in-focus positions. In addition, the in-focus regions 3001 to 3003 are displayed being superimposed on the subjects at the in-focus positions.

The blending unit 103 blends the first in-focus regions of plural images located by the locating unit 102 into a union of the first in-focus regions, to generate a second in-focus region.

Figure 5D:
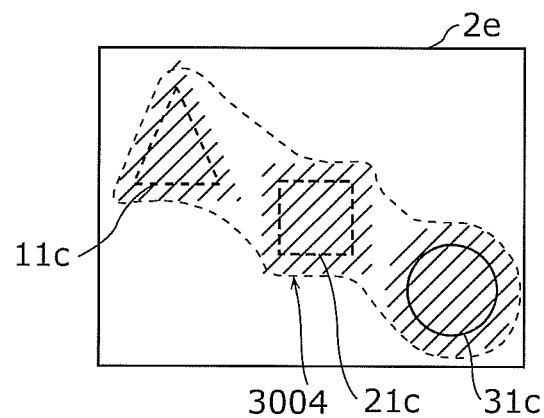
FIG. 5D illustrates a blended in-focus region obtained using FIGS. 5A to 5C.
Figure 6A:
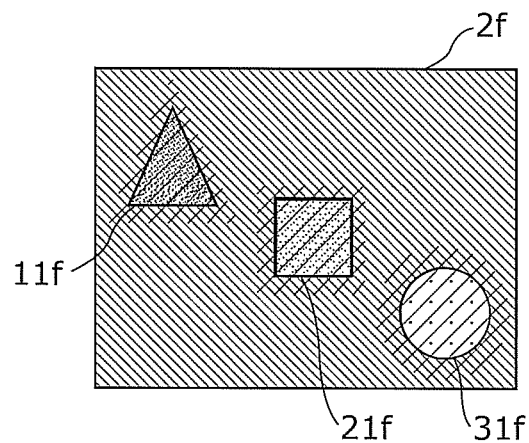
FIG. 6A illustrates depth information indicating depth values of plural captured images.
Figure 6B:
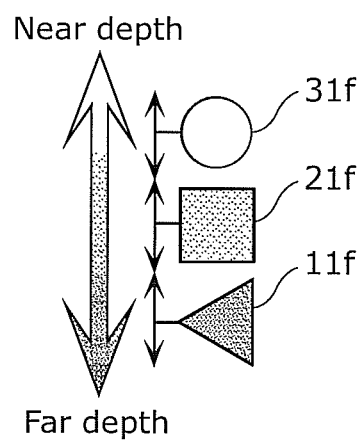
FIG. 6B illustrates depths corresponding to the subjects illustrated in FIG. 6A.

Specifically, the blending unit 103 receives an in-focus region mask (a mask indicating the first in-focus region) of each image located by the locating unit 102, and generates a mask (mask indicating the second in-focus region) showing the in-focus region of all the plural images captured by the image capture unit 101. In the following, a specific description is given using drawings. FIG. 5D illustrates a blended in-focus region obtained by blending the in-focus regions using FIGS. 5A to 5C. In addition, FIG. 6A illustrates depth information indicating depth values of captured plural images. FIG. 6B illustrates depths corresponding to the subjects illustrated in FIG. 6A.

The blending unit 103 generates a blended in-focus region 3004 (the second in-focus region) illustrated in FIG. 5D by blending the first in-focus regions located by the locating unit 102, or namely, the in-focus regions 3001 to 3002, into a union of the first in-focus regions. Here, the blending unit 103 may generate the blended in-focus region 3004 (the second in-focus region), and also as illustrated in, for example, FIG. 6A or 6B, also generate depth information indicating depth values of subjects 11*f*, 21*f*, and 31*f* on the images captured by the image capture unit 101. It should be noted that the subjects 11*f*, 21*f*, and 31*f* are respectively the same as the subjects 11*a* to 11*c* and 21*a* to 21*c*, and 31*a* to 31*c* illustrated in FIGS. 5A to 5C.

The display unit 104 displays a first image among the plural images.

It should be noted that the display unit 104 may display the first image among the plural images, and also display the second in-focus region being superimposed on the first image. In this case, for example, the display unit 104 displays a reference image for a user to determine a certain position (zoom point), using a blended in-focus region mask generated by the blending unit 103 (mask for the second in-focus region). Here, a reference image shows an image 2*e* obtained by superimposing the blended in-focus region 3004 (the second in-focus region) as illustrated in FIG. 5D on an image 2*c*, or in other words, a reference image shows the first image among plural images and the second in-focus region superimposed on the first image. The display unit 104 uses one of the images in FIGS. 3A to 3C, as a reference image (the first image) for causing a blended in-focus region mask (mask for the second in-focus region) to function (for superimposing a blended in-focus region mask).

It should be noted that the display unit 104 may newly generate an image for display based on FIGS. 3A to 3C, and display the generated image as the first image. In addition, the display unit 104 may display depth information generated by the blending unit 103 as illustrated in FIG. 6B, as supplementary information for a user to determine a certain position (zoom point), if necessary.

In addition, using, for example, an interface such as a touch panel, the user determines a certain position (zoom point) in the blended in-focus region (the second in-focus region) displayed on the reference image displayed by the display unit 104. It should be noted that an interface such as a touch panel is an example of a receiving unit, and the receiving unit receives input (determination of a zoom point) from a user, and designates the position of the zoom point in the blended in-focus region (the second in-focus region).

In addition, although a detailed description is given below, the display unit 104 displays at least a zoomed image of the second image generated by the image generation unit 106. In addition, the display unit 104 displays a first zoomed image and a second zoomed image which are generated by the image generation unit 106 in the stated order.

It should be noted that although a description is given assuming that the display unit 104 is included in an image processing device 200, the present invention is not limited this. The display unit 104 may be provided outside the image processing device 200. In addition, a configuration may be adopted in which although the display unit 104 displays a reference image as described above, the zoomed image generated by the image generation unit 106 is displayed on, for instance, a display device outside the image processing device 200.

If a certain position (for example, a zoom point) is designated on the first image (or in the second in-focus region) displayed by the display unit 104, the setting unit 105 selects at least a second image that has the first in-focus region including the certain position, from among plural images, and also sets a switching method to be used until the second image is displayed on the display unit 104.

Here, the setting unit 105 may obtain, for each of plural images, depth information of the image, and may set a switching method based on the obtained depth information.

For example, the setting unit 105 selects a third image that has the first in-focus region having a depth value between a depth value of the first in-focus region of the second image and a depth value of the first in-focus region of the first image, based on the obtained depth information. Then, the setting unit 105 may make setting, as a switching method, for displaying a third image on the display unit 104 until the second image is displayed on the display unit 104. In addition, for example, the setting unit 105 may make settings, as a switching method, for displaying on the display unit 104 a third image obtained by blending the second image and the first image in a predetermined ratio until the second image is displayed on the display unit 104.

In a specific example, the setting unit 105 sets a switching method, using a designated certain position (zoom point), an in-focus region (the first in-focus region) of each image located by the locating unit 102, and a blended in-focus region (the second in-focus region) generated by the blending unit 103. A detailed description of a switching method will be given below.

The image generation unit 106 generates a zoomed image obtained by enlarging at least the first in-focus region of the second image in accordance with the switching method set by the setting unit 105.

For example, the image generation unit 106 may generate at least a first zoomed image and a second zoomed image in accordance with the switching method set by the setting unit 105, the first zoomed image being obtained by enlarging a region that includes a region of the third image corresponding to the first in-focus region of the second image and the first in-focus region of the third image, the second zoomed image being obtained by enlarging a region that includes the first in-focus region of the second image. Furthermore, for example, the image generation unit 106 may generate at least a first zoomed image and a second zoomed image in accordance with the switching method set by the setting unit 105, the first zoomed image being obtained by enlarging the first in-focus region of the third image, the second zoomed image being obtained by enlarging the first in-focus region of the second image.

Here, a description is given using the switching method set by the setting unit 105 as an example. In the following, a description is given of the case where a zoomed image of the second image selected by the setting unit 105 is generated by the image generation unit 106, and displayed on the display unit 104.

Examples of the switching method include a method for selecting an image to which an image is switched before the second image is displayed, and a method for transitioning an image from the first image before the second image is displayed.

First is a description of a method for selecting an image.

In the following, the image 2a illustrated in FIG. 3A is assumed to be selected as the second image.

Specifically, first, a certain position (zoom point) is assumed to be designated in the blended in-focus region 3004 (the second in-focus region) when the blended in-focus region 3004 is superimposed on the image 2c in FIG. 3C and displayed on the display unit 104, as illustrated in FIG. 5D, for example. In that case, the setting unit 105 checks a depth value (depth distance) of a portion of the blended in-focus region 3004 corresponding to the designated certain position (the in-focus region 3001 in FIG. 5A). Then, the setting unit 105 determines that an image which has the designated certain position as the first in-focus region (the in-focus region 3001) is the image 2a illustrated in FIG. 3A. Then, the setting unit 105 selects the image 2a illustrated in FIG. 3A, as an image after zooming in (the second image or a zoomed image of the second image).

It should be noted that although FIG. 5D illustrates an example in which the image 2c illustrated in FIG. 3C is selected as an image (the first image) before zooming in to be displayed on the display unit 104, the present invention is not limited to this. The image 2b illustrated in FIG. 3B in which the subject 21b is captured at the in-focus position may be selected. Specifically, among plural images captured by the image capture unit 101, an image may be selected in which a subject having a depth value smaller than a depth value at a certain position (zoom point) is captured in focus. This is because a subject appears natural if the in-focus distance of the subject also changes in conjunction with a zoom magnification in view of features of a zoomed image, and thus preferably a subject distance of an image before zooming in is shorter than a subject distance of an image after zooming in.

Figure 7:
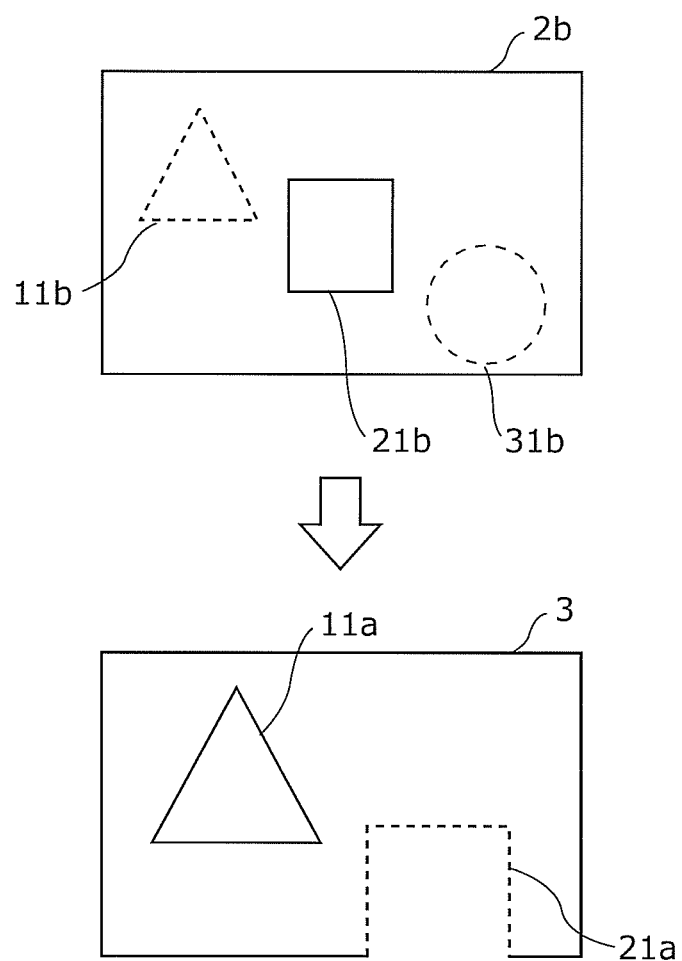
Figure 8:
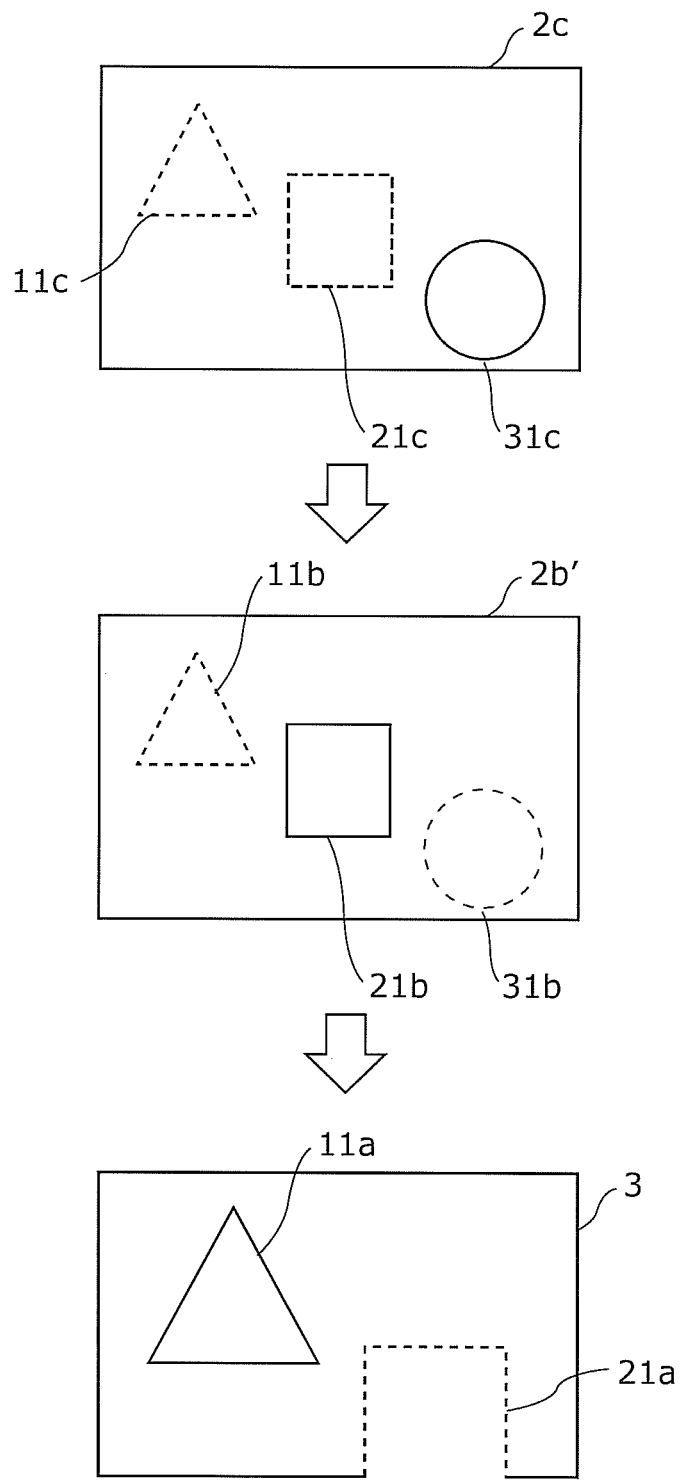

FIGS. 7 and 8 are diagrams for describing examples of images displayed on the display unit before and after zooming in. FIGS. 7 and 8 both illustrate that a designated subject is out of focus before zooming in, whereas once zooming in starts, the subject is in focus when a magnification reaches the maximum zoom magnification.

In the example illustrated in FIG. 7, first, the setting unit 105 selects the image 2b illustrated in FIG. 3B as an image before zooming in, and selects the image 2a illustrated in FIG. 3A as an image after zooming in. Furthermore, the setting unit 105 sets a switching method (parameter) indicating this selection method. Next, the image generation unit 106 generates a zoomed image 3 by enlarging the image 2a (a region which at least includes the subject 11a) illustrated in FIG. 3A in accordance with the selection method. Then, the display unit 104 displays the image 2b as an image before zooming in, and displays the zoomed image 3 as an image after zooming in.

On the other hand, in the example illustrated in FIG. 8, first, the setting unit 105 selects the image 2c illustrated in FIG. 3C as an image before zooming in, selects the image 2b illustrated in FIG. 3B as an image during zooming in, and selects the image 2a illustrated in FIG. 3A as an image after zooming in. Furthermore, the setting unit 105 sets the switching method (parameter) indicating this selection method. Next, the image generation unit 106 generates a zoomed image 2b' by enlarging the image 2b (a region which includes at least the subject 11b and the subject 21b) illustrated in FIG. 3B in accordance with the selection method, and generates the zoomed image 3 by enlarging the image 2a (a region which includes at least the subject 11a) illustrated in FIG. 3A. Then, the display unit 104 displays the image 2c as an image before zooming in, displays the zoomed image 2b' as an image during zooming in, and displays the zoomed image 3 as an image after zooming in.

It should be noted that if a subject at a certain position designated on the display unit 104 appears closest to a viewer, the image 2c illustrated in FIG. 3C may be selected as an image before and also after zooming in. Specifically, the display unit 104 may display the image 2c illustrated in FIG. 3C as an image before zooming in, and a zoomed image of the image 2c illustrated in FIG. 3C as an image after zooming in. Furthermore, a zoomed image of the image 2c illustrated in FIG. 3C may be selected as an image after zooming in, and the image 2a illustrated in FIG. 3A may be selected as an image before zooming in. In other words, a zoom magnification and the in-focus distance of a subject may not be necessarily correlated.

Furthermore, a maximum zoom magnification may be a predetermined fixed value, or a value that changes according to an object distance of a subject designated via the display unit 104.

Next is a description of a method for transitioning a zoomed image.

The following is a description given assuming that the image 2a illustrated in FIG. 3A is selected as the second image.

Figure 9:
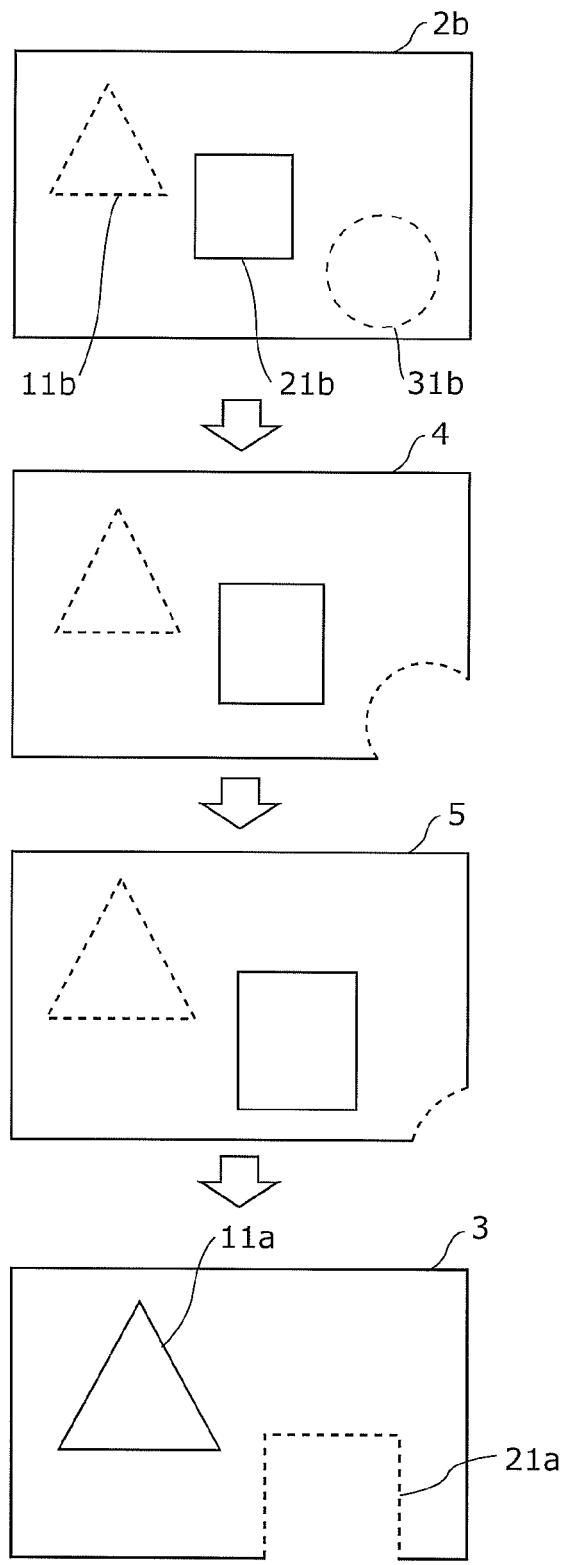
FIG. 9 is a diagram for describing examples of transition of an image displayed on the display unit, from when the image is not zoomed up to when the image is zoomed.
Figure 10:
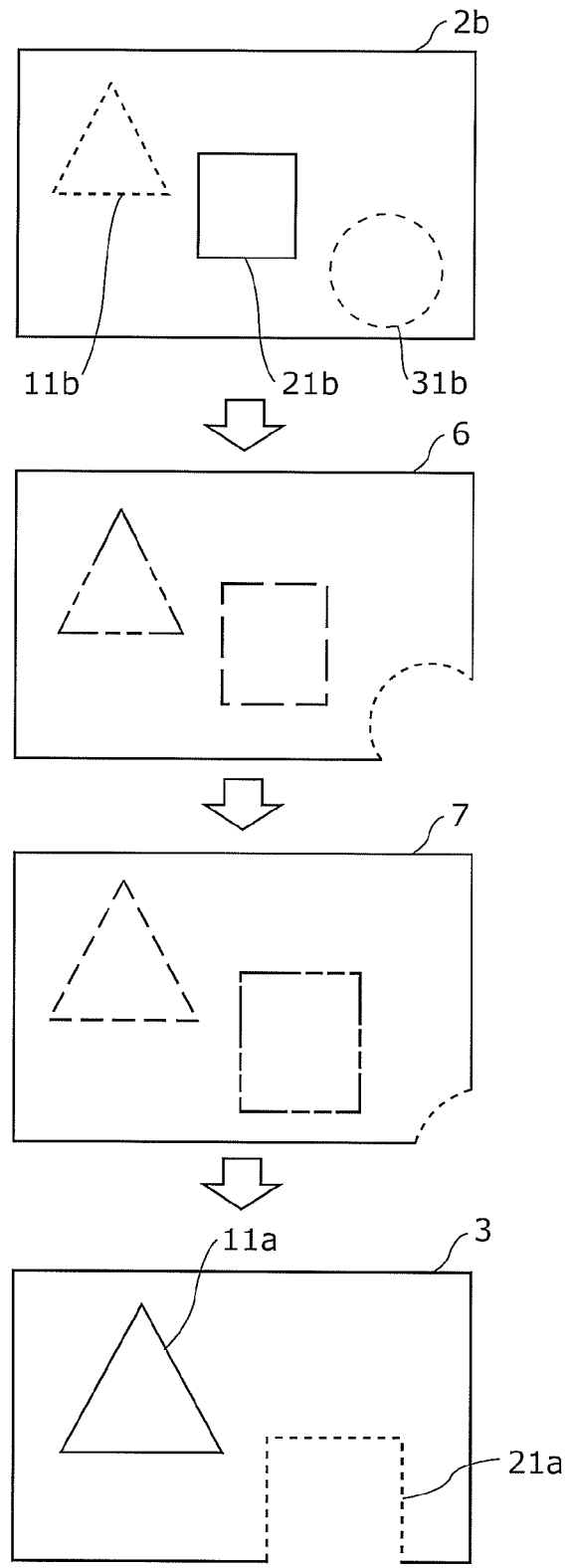
FIG. 10 is a diagram for describing an example of transition of an image displayed on the display unit, from when the image is not zoomed up to when the image is zoomed.

FIGS. 9 and 10 are diagrams for describing examples of transition of an image displayed by the display unit from when the image is not zoomed up to when the image is zoomed.

The examples illustrated in FIG. 9 show that a zoom target image is transitioned such that as a transition method, the image 2b illustrated in FIG. 3B is continuously used from the start of and during zooming in, and is switched to the image 2a illustrated in FIG. 3A at the time of the maximum zoom magnification (after zooming in).

Specifically, first, the setting unit 105 selects the image 2b illustrated in FIG. 3B as an image from the start of and during zooming in, and selects the image 2a illustrated in FIG. 3A as an image after zooming in, and furthermore, sets a switching method (parameter) indicating such a transition method. Next, the image generation unit 106 enlarges the image 2b illustrated in FIG. 3B in accordance with the transition method, and generates zoomed images 4 and 5 at different zoom magnifications. Furthermore, the image generation unit 106 generates the zoomed image 3 by enlarging the image 2a (a region which includes at least a region corresponding to the subject 11a) illustrated in FIG. 3A. Then, the display unit 104 displays the image 2b as an image before zooming in (at the start of zooming in), displays the zoomed images 4 and 5 as images during zooming in, and displays the zoomed image 3 as an image after zooming in.

Furthermore, the examples illustrated in FIG. 10 show as a transition method that a zoom target image is transitioned such that the image 2b illustrated in FIG. 3B is used when zooming in starts, the image 2a illustrated in FIG. 3A is used at the time of the maximum zoom magnification (after zooming in), and during zooming in, the image is switched to an image obtained by blending the image 2b illustrated in FIG. 3B and the image 2a illustrated in FIG. 3A in a predetermined ratio.

Specifically, first, the setting unit 105 selects the image 2b illustrated in FIG. 3B as an image before zooming in (when zooming in starts), selects, as an image during zooming in, an image obtained by blending the image 2b illustrated in FIG. 3B and the image 2a illustrated in FIG. 3A in a predetermined ratio, and selects the image 2a illustrated in FIG. 3A as an image after zooming in, and furthermore, sets a switching method (parameter) indicating such a transition method. Next, the image generation unit 106 enlarges, in accordance with the transition method, an image obtained by blending the image 2b illustrated in FIG. 3B and the image 2a illustrated in FIG. 3A in a predetermined ratio, to generate zoomed images 6 and 7 at different zoom magnifications. Furthermore, the image generation unit 106 generates the zoomed image 3 by enlarging the image 2a (a region which includes at least a region corresponding to the subject 11a) illustrated in FIG. 3A. Then, the display unit 104 displays the image 2b as an image before zooming in, displays the zoomed images 6 and 7 as images during zooming in, and displays the zoomed image 3 as an image after zooming in.

In this way, based on plural images captured by the image capture unit 101, and switching methods (parameters) set by the setting unit 105, such as a selection method and a transition method, a zoomed image is generated by the image generation unit 106, and is displayed on the display unit 104.

It should be noted that a description of the switching method is given above assuming that a zoomed image is obtained by enlarging an original image, the present invention is not limited to this. An image with unit magnification, namely, a 1.0× image may also be a zoomed image. If an image with unit magnification is used, a switch is made simply to an image having an in-focus region which includes a certain position selected by the setting unit 105.

Figure 11:
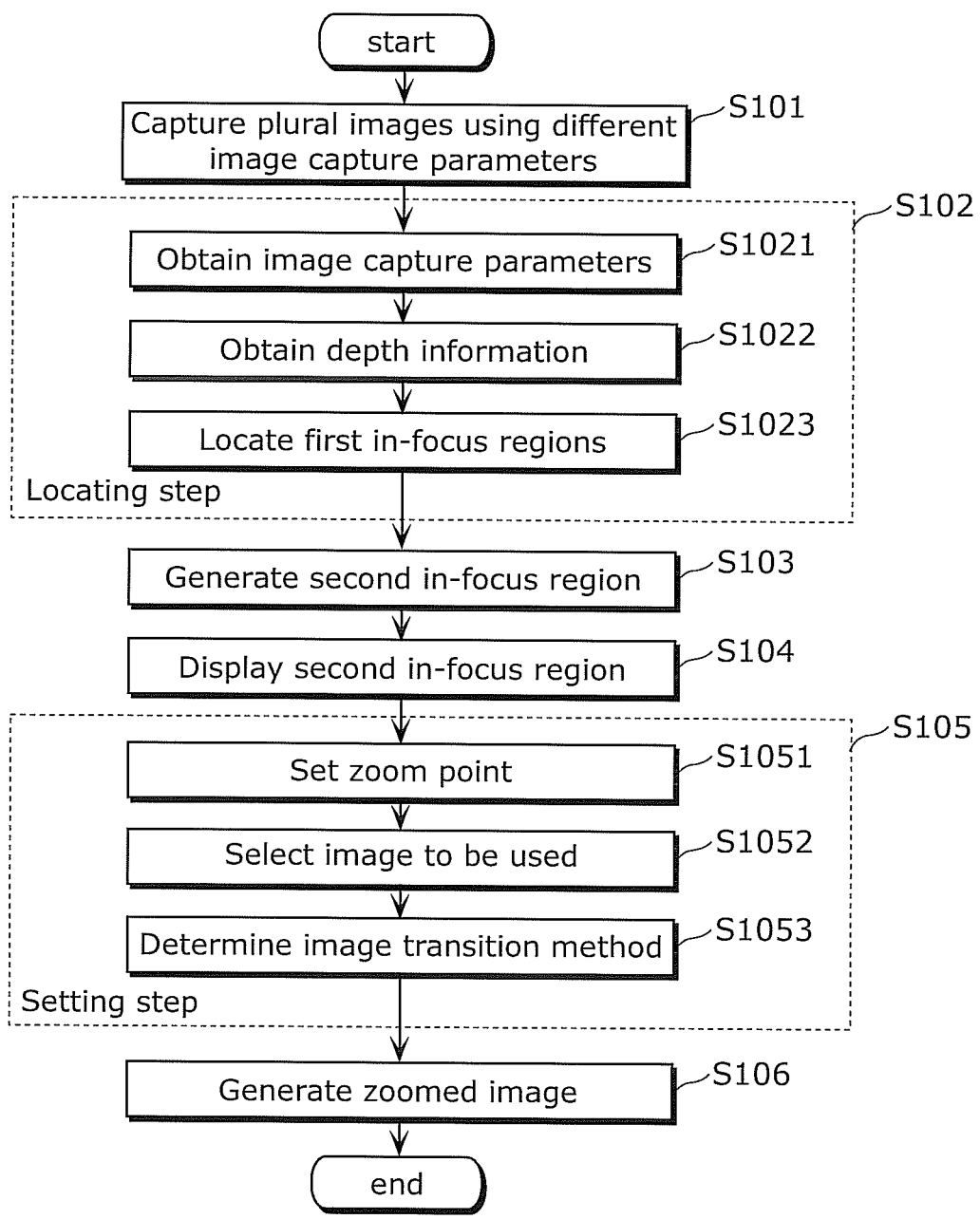
FIG. 11 is a diagram for describing a flow of processing by the image processing device according to Embodiment 1.

The following describes using FIG. 11 a flow of processing by the image processing device 100 having a configuration as described above.

FIG. 11 is a diagram for describing a flow of processing by an image processing device according to the present embodiment.

First, the image capture unit 101 captures plural images having different in-focus positions, using different image capture parameters (S101).

Next, the locating unit 102 locates a first in-focus region of each of plural images which are obtained by capturing the same subject and have different in-focus positions (S102). Specifically, first, the locating unit 102 receives plural images captured in S101, and also obtains image capture parameters each including at least information on an in-focus position, which are associated with the images (S1021). Next, the locating unit 102 obtains depth information of the plural images captured in S101 (S1022). Next, the locating unit 102 locates the first in-focus region of each of the plural images captured in S101 using the depth information (S1023).

Next, the blending unit 103 blends the first in-focus regions located by the locating unit 102 into a union of the first in-focus regions, to generate the second in-focus region (S103). Specifically, the blending unit 103 blends the first in-focus regions each located in S105, to generate a region (the second in-focus region) in focus from all the plural images.

Next, the display unit 104 displays a first image among the plural images, and also the second in-focus region superimposed on the first image (S104). Thus, the display unit 104 displays the second in-focus region generated in S105. The display unit 104 prompts a user to designate a zoom point via user interface (UI) display, for instance. It should be noted that the display unit 104 may merely display the first image among the plural images, rather than displaying the second in-focus region as described above.

Next, if the user designates a zoom point in the second in-focus region, the setting unit 105 selects at least a second image having the first in-focus region which includes the zoom point, and also sets a switching method to be used until the selected second image is displayed on the display unit 104 (S105).

Specifically, first, the setting unit 105 sets a certain position designated by the user as a zoom point of a zoomed image (S1051). Next, using depth information of the second in-focus region designated as a zoom point, the setting unit 105 selects an image to be used for display from among the plural images captured in S101 (S1052). Here, an image from which a zoomed image is generated may also be selected. Specifically, the setting unit 105 sets a method for selecting an image to which a switch is made before the second image is displayed. Next, the setting unit 105 determines a transition method as to how the image selected in S1052 is caused to transition along with a change in zoom magnification, for example (S1053). Specifically, the setting unit 105 sets a method for transitioning an image after switching the first image, which is to be used until the second image is displayed.

Next, the image generation unit 106 generates a zoomed image obtained by enlarging at least the first in-focus region of the second image in accordance with the switching method set by the setting unit 105 (S106). For example, the image generation unit 106 generates a zoomed image using the image selected by S1052, in accordance with the transition method determined in S1053.

Finally, the display unit 104 displays the image selected in S1052. Here, if there is a zoomed image generated by the image generation unit 106 in S106, the zoomed image is displayed instead of the selected image.

As described above, the present embodiment achieves an image processing device and an image processing method which can clearly display an image region which includes a certain position designated on a display image.

For example, a zoomable region can be expanded when a zoom function is used for an image which includes a blurry region (which is an image region including a certain position), and thus a zoom function can be efficiently carried out.

Furthermore, according to the image processing device and the image processing method according to the present embodiment, plural images having different image capture parameters can be switched according to zoom magnification. Not only this eases practical limitation imposed on a conventional zoom function due to a focusing state of an image (limitation of a zoom function due to a focusing state), a valid scope of a zoom function can be expanded.

As described above, according to the present embodiment, by using plural images having different in-focus positions, even an image with a blurry region can be switched to an image in a clear state or a zoomed image obtained from a blurry region can be displayed.

More specifically, according to the image processing device and the image processing method according to the present embodiment, the first in-focus regions of plural images are located, and even if a display image includes a blurry region, a second in-focus region over plural images is displayed. Accordingly, if a zoom point in the second in-focus region is designated through touch or the like, zooming in can be performed while increasing a zoom magnification and simultaneously, switching to an image which has an in-focus range corresponding to a zoom magnification at that time. Thus, even a blurry region can be zoomed clearly.

It should be noted that with an image processing device and an image processing method according to the present embodiment, input (designation) via a touch panel or the like may be made to determine a zoom point for when zooming in on an image, for example.

Embodiment 2

Figure 12:
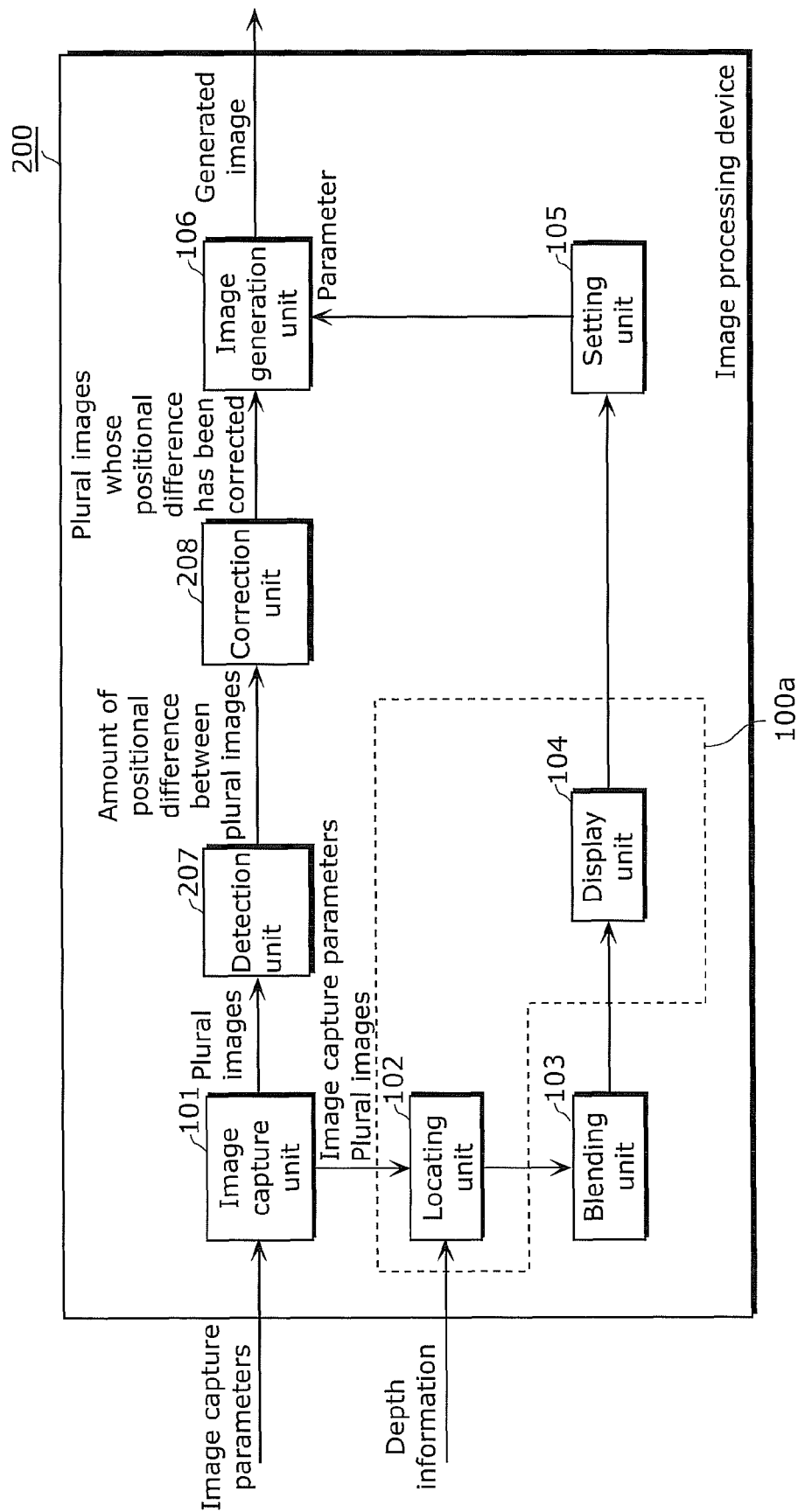
FIG. 12 is a block diagram illustrating a schematic structure of an image processing device according to Embodiment 2.

A description is given of an image processing device 200 according to Embodiment 2, with reference to FIG. 12.

FIG. 12 is a block diagram illustrating a schematic configuration of an image processing device according to Embodiment 2. It should be noted that the same numerals are given to the same elements as those in FIG. 2, and a detailed description thereof is omitted. The image processing device 200 illustrated in FIG. 12 includes an image capture unit 101, a locating unit 102, a blending unit 103, a display unit 104, a setting unit 105, an image generation unit 106, a detection unit 207, and a correction unit 208. The image processing device 200 illustrated in FIG. 12 differs from the image processing device 100 illustrated in FIG. 2 in that the detection unit 207 and the correction unit 208 are included. The following describes only constituent elements different from those of the image processing device 100 according to Embodiment 1.

The purpose of introducing the detection unit 207 and the correction unit 208 is as follows. Plural images are captured by the image capture unit 101 at different times. Accordingly, if, for example, a camera provided with the image capture unit 101 or a subject moves after the first image is captured and before the second image is captured, the position of the subject may not be the same in the first image and the second image. If a zoomed image is generated using plural images in such a case, when the image displayed by the display unit 104 is changed, the position of the subject also changes simultaneously, which may give a user odd feeling.

Figure 13A:
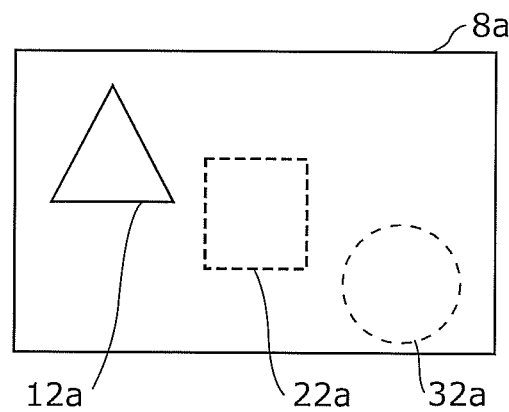
FIG. 13A is a diagram for describing a purpose of introducing a detection unit and a correction unit according to Embodiment 2.
Figure 13B:
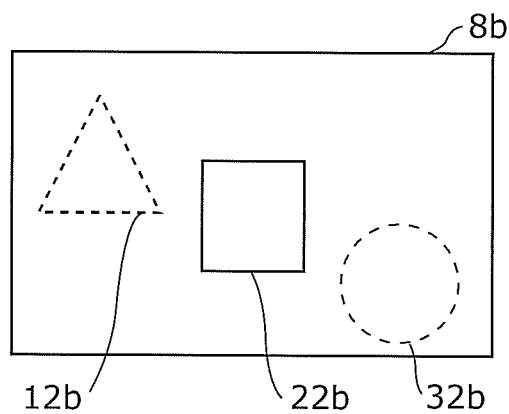
FIG. 13B is a diagram for describing a purpose of introducing the detection unit and the correction unit according to Embodiment 2.
Figure 13C:
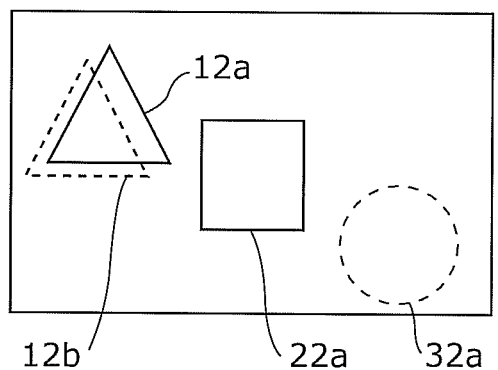
FIG. 13C is a diagram for describing a purpose of introducing the detection unit and the correction unit according to Embodiment 2.

FIGS. 13A to 13D are diagrams for describing a purpose of introducing the detection unit and the correction unit in the present embodiment. FIGS. 13A and 13B illustrate examples of plural images captured sequentially in time according to the present embodiment, and show examples in which the position of a subject has changed. FIG. 13C is a diagram for describing a positional difference when images illustrated in FIGS. 13A and 13B are displayed on the display unit.

When an image 8a illustrated in FIG. 13A is switched to an image 8b illustrated in FIG. 13B, for example, positional differences between subjects 12a and 12b and between subjects 22a and 22b are prominent on the display unit 104, as illustrated in FIG. 13C. It should be noted that a positional difference between subjects 32a and 32b is not prominent.

Figure 13D:
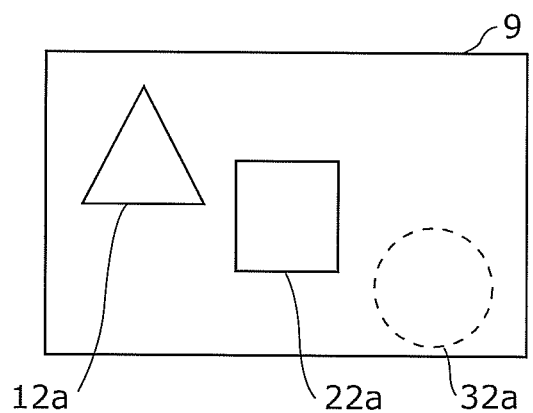
FIG. 13D is a diagram for describing a purpose of introducing the detection unit and the correction unit according to Embodiment 2.

Thus, in order to avoid this, the detection unit 207 and the correction unit 208 are used to correct positional differences between plural images captured by the image capture unit 101, thus causing a subject to be at the same position in plural images, as illustrated in FIG. 13D.

The detection unit 207 detects an amount of positional differences of the same subject between plural images.

Specifically, the detection unit 207 receives plural images captured by the image capture unit 101, and detects the amount of positional differences between the received plural images. It should be noted that as a method for detecting the amount of positional difference, a conventional method such as motion vector calculation may be used to detect a shift to obtain an amount of positional difference, and thus a detailed description thereof is omitted. Furthermore, the detection unit 207 causes the positions of a subject to be the same in plural images, and thus calculates an amount of positional difference relative to one of the plural images when detecting an amount of positional difference. For example, if plural images are three images, the detection unit 207 detects an amount of positional difference of a first image relative to a second image, and detects an amount of positional difference of the second image relative to a third image Based on the amount of positional difference detected by the detection unit 207, the correction unit 208 corrects the amount of positional difference of the subject between plural images.

Specifically, the correction unit 208 corrects the amount of positional difference between plural images, using, as input, plural images captured by the image capture unit 101 and an amount of positional difference detected by the detection unit 207. If the detection unit 207 calculates, for example, an amount of positional difference between the image 8a illustrated in FIG. 13A and the image 8b illustrated in FIG. 13B, the correction unit 208 corrects a positional difference of a subject as shown by an image 9 illustrated in FIG. 13D using the amount of positional difference of the second image relative to the first image detected by the detection unit 207.

As described above, the present embodiment achieves an image processing device and an image processing method which can clearly display an image region which includes a certain position designated on a display image.

Embodiment 3

Figure 14:
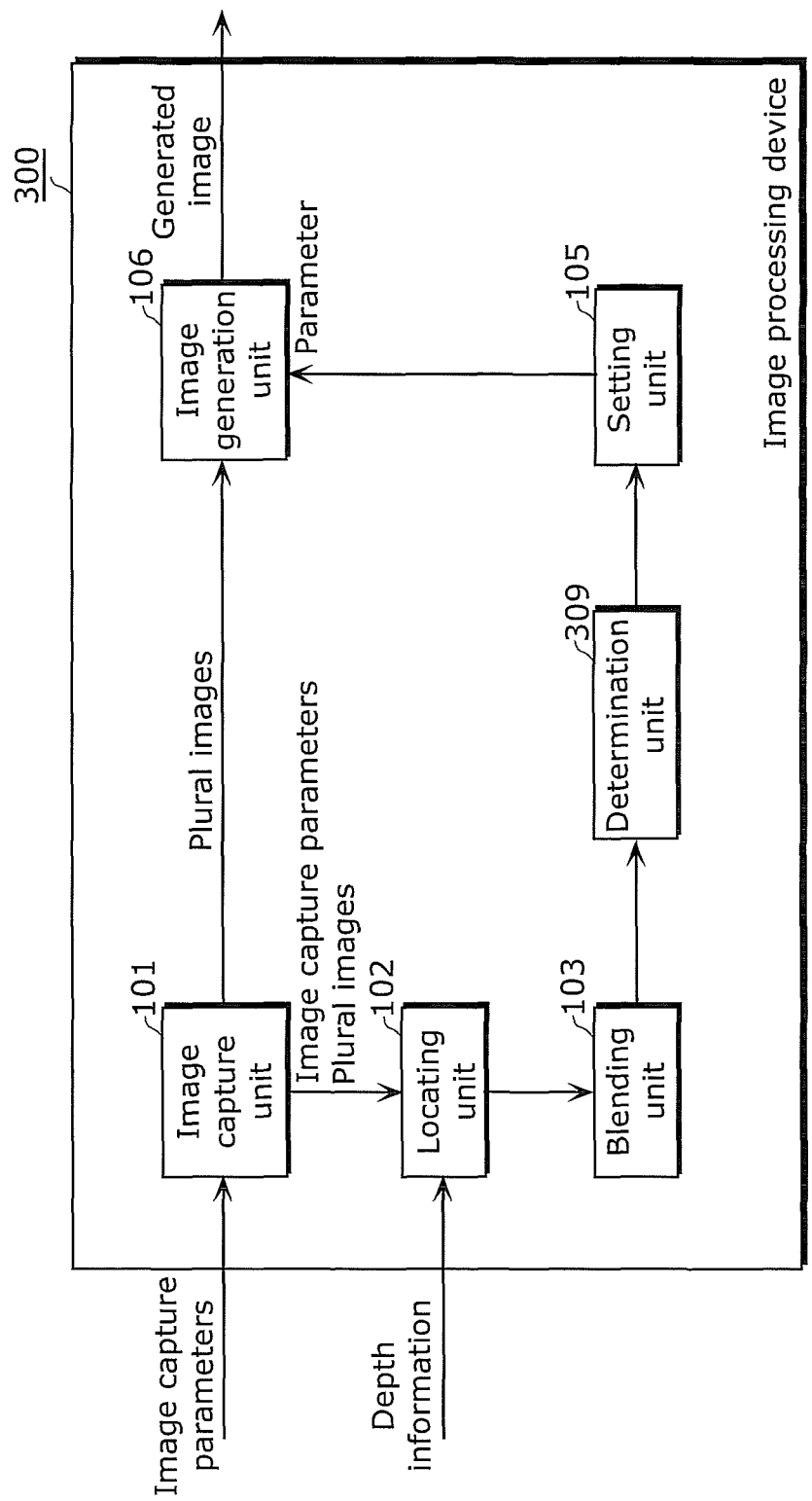
FIG. 14 is a block diagram illustrating a schematic structure of an image processing device according to at Embodiment 3.

A description is given of an image processing device 300 according to Embodiment 3 with reference to FIG. 14.

FIG. 14 is a block diagram illustrating a schematic structure of an image processing device according to Embodiment 3. It should be noted that the same numerals are given to the same elements as those in FIG. 2, and a detailed description thereof is omitted. The image processing device 200 illustrated in FIG. 14 includes an image capture unit 101, a locating unit 102, a blending unit 103, a setting unit 105, an image generation unit 106, a detection unit 207, and a correction unit 208. The image processing device 300 illustrated in FIG. 14 differs from the image processing device 100 illustrated in FIG. 2 in that the display unit 104 is not included, and a determination unit 309 is included.

In Embodiment 1, a description is given of an example of the case where a user designates a zoom point (certain position) via the display of the display unit 104. In contrast, the determination unit 309 automatically sets a zoom point in Embodiment 3, instead of a user designating a zoom point (certain position).

The determination unit 309 automatically determines and designates a certain position. Furthermore, the determination unit 309 determines a certain position in a second in-focus region generated by the blending unit 103. Specifically, the determination unit 309 automatically sets a zoom point within the range of the second in-focus region, based on the second in-focus region.

It should be noted that the determination unit 309 may use any of the images captured by the image capture unit 101, as an image for detection (first image) on which the second in-focus region is superimposed. The determination unit 309 may generate an image for detection by blending images, and use the generated image. Any method may be used to detect a zoom point, and a face of a person detected through face detection may be used as a zoom point.

As described above, the present invention achieves an image processing device and an image processing method which can clearly display an image region which includes a certain position designated on a display image.

Figure 15:
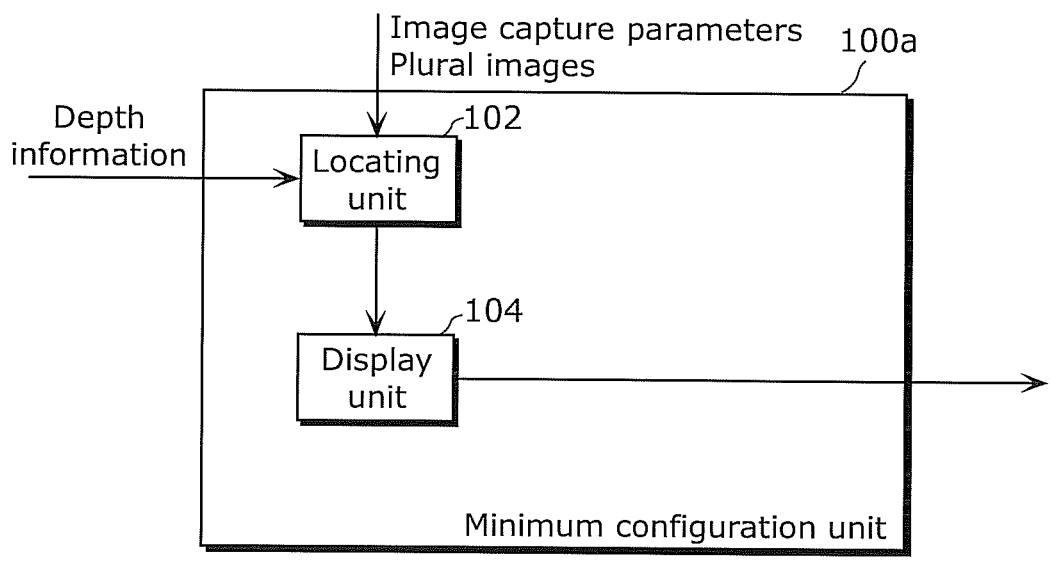
FIG. 15 is a block diagram illustrating a minimum configuration of an image processing device according to the present invention.

It should be noted that although a description is given assuming that the image processing device according to Embodiments 1 to 3 include at least the image capture unit 101, the locating unit 102, the blending unit 103, the setting unit 105, and the image generation unit 106, the present invention is not limited to this. The image processing device may include a minimum configuration unit 100a, as the minimum configuration thereof, as illustrated in FIG. 15. In other words, the image processing device may include the locating unit 102 and the display unit 104. Here, FIG. 15 is a block diagram illustrating the minimum configuration of the image processing device according to the present invention. It should be noted that the same numerals are given to the same elements as those in FIG. 2, and thus a detailed description thereof is omitted.

The image processing device according to the present invention may include at least the minimum configuration unit 100a, which allows clear display of an image region which includes a certain position designated on a display image.

Figure 16:
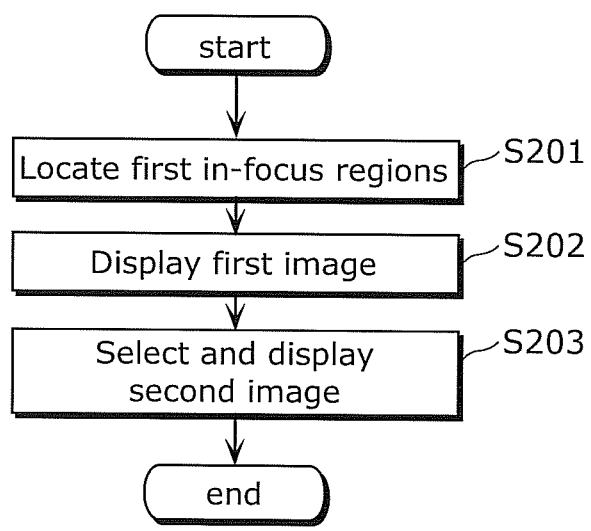
FIG. 16 illustrates processing by a minimum configuration unit of the image processing device according to the present invention.

Furthermore, although a description is given assuming that an image processing method according to the present invention is typically for performing processing illustrated in FIG. 11, the present invention is not limited to this. The minimum configuration unit 100a illustrated in FIG. 15 may at least perform steps illustrated in FIG. 16. Here, FIG. 16 illustrates processing by the minimum configuration unit of the image processing device according to the present invention.

More specifically, first, the locating unit 102 locates the first in-focus region of each of plural images which are obtained by capturing the same subject and have different in-focus positions (S201). Details are the same as those of S102, and thus a description thereof is omitted.

Next, a first image among the plural images is displayed on the display unit 104 (S202). Details are as described for S104, and thus a description thereof is omitted.

If a certain position is designated on the first displayed image, the minimum configuration unit 100a selects at least a second image having the first in-focus region which includes the certain position, from among the plural images, and also displays the selected second image on the display unit 104 (S203).

It should be noted that the processing indicated in S203 is a part of processing of S105 and S106, and includes S1052 and S106 at least.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which achieves, for instance, the image processing device in the above embodiments is a program as will be described below.

Specifically, this program causes a computer to execute: (a) locating a first in-focus region of each of plural images which are obtained by capturing a same subject and have different in-focus positions; and (b) displaying a first image among the plural images on a display unit, wherein when a certain position is designated on the first image displayed in step (b), at least a second image having the first in-focus region which includes the certain position is selected from among the plural images, and the selected second image is displayed on the display unit.

Although the above describes, based on the embodiments, an image processing device and an image processing method according to one or more aspects of the present invention, the present invention is not limited to the above embodiments. Various modifications to the embodiments that may be conceived by those skilled in the art and combinations of constituent elements in different embodiments may be included within the scope of one or more aspects of the present invention, without departing from the spirit of the present invention.

INDUSTRIAL APPLICABILITY

The present invention can be used for noncommercial and business use imaging devices (a digital still camera, a video camera) and devices such as a mobile terminal, and in particular for an image processing device and an image processing method which generate a zoomed image while switching images, using depth information and plural images captured by an imaging device using different image capture parameters.

REFERENCE SIGNS LIST 1, 1a, 1b, 1c, 1d, 1e, 2, 2a, 2b, 2c, 2e, 8a, 8b, 9 Image
2b', 3, 4, 6, 7 Zoomed image
10, 11a, 11b, 11c, 11d, 11f, 12a, 12b, 20, 21b, 22a, 22b, 30, 31c,
32a, 32b Subject
100, 200, 300 Image processing device
100a Minimum configuration unit
101 Image capture unit 102 Locating unit
103 Blending unit
104 Display unit
105 Setting unit
106 Image generation unit
207 Detection unit
208 Correction unit
309 Determination unit
3001, 3002, 3003 In-focus region
3004 Blended in-focus region

The invention claimed is:

1. An image processing device comprising:
a processor; and
a non-transitory computer-readable medium having stored thereon executable instructions that, when executed by the processor, cause said image processing device to function as:
a locating unit configured to locate a first in-focus region of each of plural images which are obtained by capturing a same subject and have different in-focus positions;
a display unit configured to display a first image among the plural images; and
a blending unit configured to generate a second in-focus region showing an image which is obtained by blending the first in-focus regions of the plural images located by the locating unit into a union of the first in-focus regions,
wherein the display unit is configured to display the first image and the second in-focus region superimposed on the first image, and
when a certain position is designated in the second in-focus region superimposed on the first image displayed by the display unit, at least a second image having the first in-focus region which includes the certain position is selected from among the plural images, and the selected second image is displayed on the display unit.

2. The image processing device according to claim 1, wherein the executable instructions, when executed by the processor, cause said image processing device to further function as an image capture unit configured to capture the plural images by capturing sequentially in time plural images having different image capture parameters each including at least information on an in-focus position.

3. The image processing device according to claim 1,
wherein the locating unit is configured to locate, for each of the plural images, the first in-focus region using depth information of the image.

4. The image processing device according to claim 1, wherein the executable instructions, when executed by the processor, cause said image processing device to further function as:
a setting unit configured to, when the certain position is designated on the first image displayed by the display unit, select at least the second image from among the plural images, and set a switching method which is to be used until the second image is displayed on the display unit; and
an image generation unit configured to generate a zoomed image obtained by enlarging a region which includes at least the first in-focus region of the second image, in accordance with the switching method set by the setting unit,
wherein the display unit is configured to display, as the second image, at least the zoomed image of the second image generated by the image generation unit.

5. The image processing device according to claim 4,
wherein the setting unit is further configured to obtain, for each of the plural images, depth information of the image, and set the switching method based on the obtained depth information.

6. The image processing device according to claim 5,
wherein the setting unit is configured to select, based on the obtained depth information, a third image having the first in-focus region which has a depth value between a depth value of the first in-focus region of the second image and a depth value of the first in-focus region of the first image, and as the switching method, make a setting for displaying the third image on the display unit until the second image is displayed on the display unit,
the image generation unit is configured to generate at least a first zoomed image and a second zoomed image in accordance with the switching method, the first zoomed image being obtained by enlarging a region which includes the first in-focus region of the third image and a region of the third image corresponding to the first in-focus region of the second image, the second zoomed image being obtained by enlarging a region which includes the first in-focus region of the second image, and
the display unit is configured to display, in order, the first zoomed image and the second zoomed image generated by the image generation unit.

7. The image processing device according to claim 5,
wherein as the switching method, the setting unit is configured to make a setting for displaying a third image on the display unit until the second image is displayed on the display unit, the third image being obtained by blending the second image and the first image in a predetermined ratio,
the image generation unit is configured to generate at least a first zoomed image and a second zoomed image in accordance with the switching method, the first zoomed image being obtained by enlarging a region which includes the first in-focus region of the third image and a region of the third image corresponding to the first in-focus region of the second image, the second zoomed image being obtained by enlarging a region which includes the first in-focus region of the second image, and
the display unit is configured to display, in order, the first zoomed image and the second zoomed image generated by the image generation unit.

8. The image processing device according to claim 1, wherein the executable instructions, when executed by the processor, cause said image processing device to further function as a determination unit configured to automatically determine and designate the certain position.

9. The image processing device according to claim 8,
wherein the determination unit is configured to determine the certain position in the second in-focus region generated by the blending unit.

10. The image processing device according to claim 1, wherein the executable instructions, when executed by the processor, cause said image processing device to further function as a receiving unit configured to receive input from a user to designate the certain position.

11. The image processing device according to claim 1, wherein the executable instructions, when executed by the processor, cause said image processing device to further function as:
a detection unit configured to detect an amount of positional difference of the same subject between the plural images; and
a correction unit configured to correct the amount of positional difference of the same subject between the plural images, based on the amount of positional difference detected by the detection unit.

12. An image processing method comprising:
locating, using a processor, a first in-focus region of each of plural images which are obtained by capturing a same subject and have different in-focus positions;
displaying a first image among the plural images on a display unit;
generating a second in-focus region showing an image which is obtained by blending the first in-focus regions of the plural images located in said locating into a union of the first in-focus regions,
wherein said displaying further comprises displaying the second in-focus region superimposed on the first image, and
when a certain position is designated in the second in-focus region superimposed on the first image displayed in said displaying, at least a second image having the first in-focus region which includes the certain position is selected from among the plural images, and the selected second image is displayed on the display unit.

13. An integrated circuit comprising:
a locating circuit configured to locate a first in-focus region of each of plural images which are obtained by capturing a same subject and have different in-focus positions; and
a blending circuit configured to generate a second in-focus region showing an image which is obtained by blending the first in-focus regions of the plural images located by the locating circuit into a union of the first in-focus regions,
wherein when a certain position is designated in the second in-focus region superimposed on a first image displayed by a display unit which displays the first image among the plural images and the second-in-focus region superimposed on the first image, at least a second image having the first in-focus region which includes the certain position is selected from among the plural images, and the selected second image is displayed on the display unit.

* * * * *